Patented Nov. 10, 1936

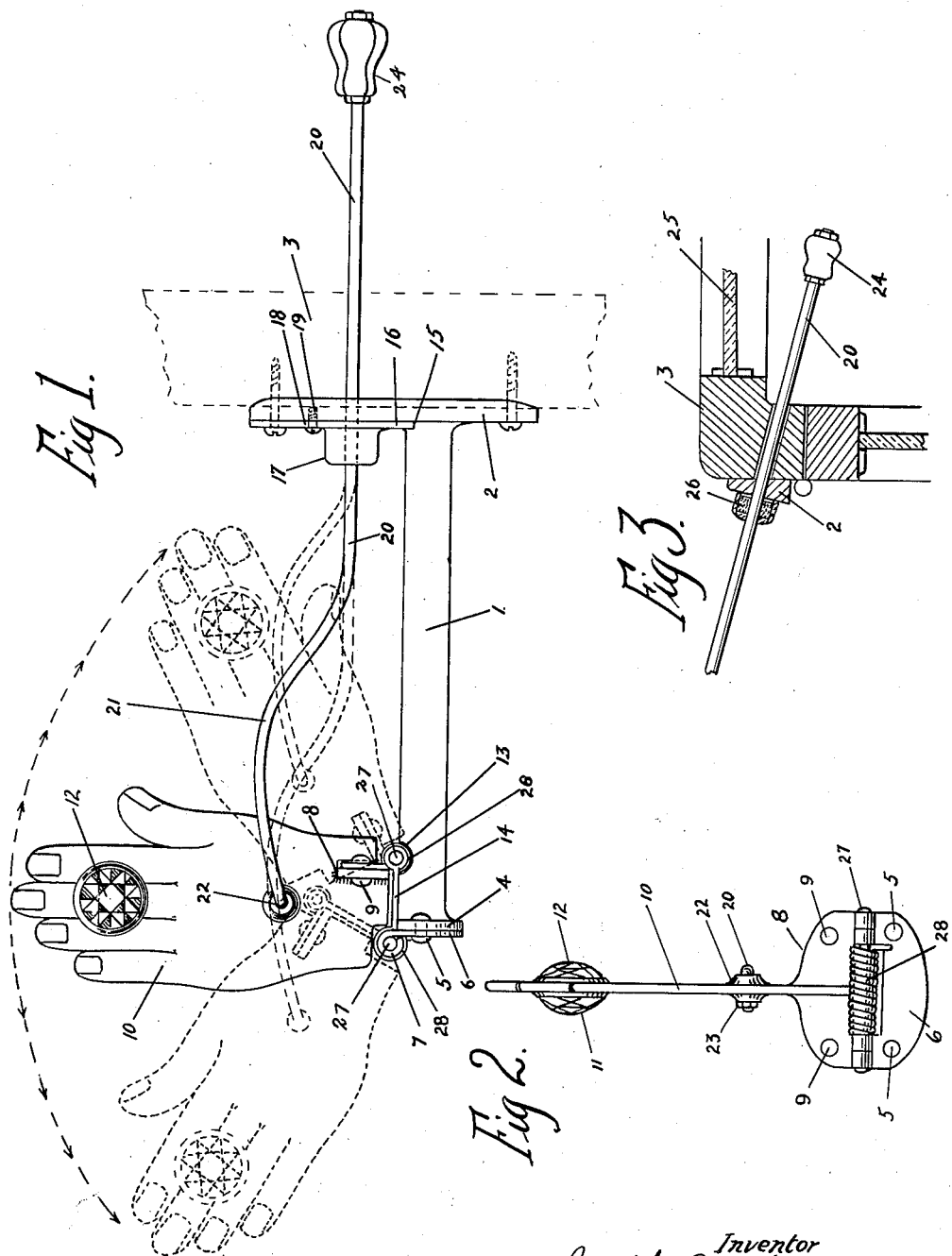

2,060,483

UNITED STATES PATENT OFFICE 2,060,483

SIGNAL DEVICE FOR MOTOR VEHICLES

Joseph Bamberger, Cincinnati, Ohio

Application October 19, 1934, Serial No. 749,091

2 Claims. (Cl. 116—51)

The present invention relates to signal devices for motor vehicles, whereby the operator of such a vehicle may indicate the direction of a turn which he proposes to take thus warning the operators of other vehicles both to the rear of his vehicle and those in front of same going in the opposite direction.

The principal object of my invention is to provide certain improvements in the signal device disclosed in my Patent No. 1,511,751, dated October 14, 1924, whereby the operation of the direction indicating member is facilitated and made less liable to failure or error.

A further object is to improve the appearance of the device, making it more ornamental and attractive when applied to a motor vehicle.

Further objects will appear from the following detailed description thereof.

In the drawing:

Figure 1 is an elevation of my new signaling device showing the same attached to the frame of a vehicle.

Figure 2 is an end view of the device.

Figure 3 is a section showing the attachment of the device.

The numeral 1 indicates a supporting rod or bar, the same being attached to or integrally formed with a plate 2 whereby it may be secured in the jamb 3 or other frame member of a motor vehicle. The rear surface of the plate 2 is beveled as clearly shown in Figure 3 for the purpose hereinafter set forth. The outer end of the rod 1 has integrally formed therewith or attached thereto a plate 4 at right angles to the rod. Secured to the plate 4 by means of rivets or bolts 5 is one leaf 6 of a two-way spring hinge 7. Secured to the leaf 8 of the hinge 7 by means of rivets or bolts 9 is a metal representation of a hand 10. The hand 10 has secured to its front and rear surfaces respectively jewels 11 and 12, the front jewel 11 being preferably green and the rear jewel being red. The rod 1 is notched as shown at 13 to provide a recess for the inner pin and spring of the hinge so that the middle leaf 14 is adapted normally to rest flat against the upper surface of the rod. The upper surface of the rod 1 is also notched as shown at 15 adjacent plate 2 to form a seat for the flange 16 of a bearing member 17; the upper flange 18 of the bearing member is secured to the plate 2 by means of a screw 19. Slidably mounted in the bearing 17 is a rod 20 which is curved, as shown at 21, toward its outer end, said end being bent so as to enter a pivotal bearing 22 in the hand 10, through which it passes, and in which it is secured by means of a nut 23. The inner end of the rod 20 passes through a bore in the jamb and extends inside the vehicle, the end being provided with an operating handle 24. By reason of the beveled rear surface of the mounting plate 2 the rod inside the vehicle is caused to diverge from the wind shield or other front portion of the vehicle, it thus being freely accessible for operation. The bearing member 17 is provided with a rubber or other water proof washer 26 which is adapted to serve as an anti-rattle bearing and also to prevent water from following the rod inside of vehicle. The hinge 7 is provided around its two pintles 27 with the usual springs 28 which normally hold the hinge in the position shown in full lines in Figure 1.

The use and operation of the device will be apparent from the foregoing description taken in connection with the drawing. The hand 10 by reason of its mounting is adapted to move both to the left and to the right to the positions illustrated in broken lines in Figure 1. This operation is effected by moving the rod 20 either to the left or to the right as desired. The movement of the operator's own hand in moving the rod is thus in the same direction as that of the hand 10 in each instance, making the direction operating mechanism intuitive for the operator. The jewels 11 and 12 are adapted to indicate at night by their reflective power the position of the hand so as to warn both following and oncoming drivers.

It will be apparent that certain modifications in the device as above illustrated and described may be made without departing from the spirit and scope of the invention as disclosed and described in the appended claims. For instance, an arrow or other pointer might be substituted for the hand 10.

Having thus fully described my invention, what I claim as new and desire to secure by Letters Patent is:

1. A device of the character specified comprising a plate the rear face of which is beveled, a bar carried by said plate, means for securing said plate with its beveled face in abutment against the frame of a motor vehicle, a hinge leaf secured to the outer end of said bar, a middle hinge leaf pivotally secured to the first leaf and adapted to lie flat on the upper surface of said bar, a third hinge leaf pivotally secured to said middle leaf and adapted to extend upwardly from said bar in a substantially vertical direction, springs adapted normally to maintain said leaves in said positions, an indicating member secured to the third leaf of said hinge, a rod, and a bearing carried by said plate, said rod passing slidably through said bearing and plate and the inner end of said rod extending considerably beyond the corresponding end of said bar, and the other end of said rod being pivotally secured in said indicating member.

2. A device of the character specified comprising a plate, the rear face of which is beveled, a bar carried by said plate, means for securing said plate with its beveled face in abutment against the frame of a motor vehicle, a hinge leaf secured to the outer end of said bar, a middle hinge leaf pivotally secured to the first leaf the upper surface of said bar being notched so that said middle leaf will lie snugly against the surface of said bar, a third hinge leaf pivotally secured to said middle leaf and adapted to extend upwardly from said bar in a substantially vertical direction, springs adapted normally to maintain said leaves in said positions, an indicating member secured to the third leaf of said hinge, a rod, and a bearing carried by said plate, said rod passing slidably through said bearing and plate and the inner end of said rod extending considerably beyond the corresponding end of said bar, and the other end of said rod being pivotally secured in said indicating member.

JOSEPH BAMBERGER.